(12) United States Patent
Bender

(10) Patent No.: US 9,333,393 B2
(45) Date of Patent: May 10, 2016

(54) METHOD OF MAKING A GOLF BALL CORE

(75) Inventor: Aaron Craig Bender, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 964 days.

(21) Appl. No.: 13/341,374

(22) Filed: Dec. 30, 2011

(65) Prior Publication Data

US 2013/0172121 A1 Jul. 4, 2013

(51) Int. Cl.
| | |
|---|---|
| *A63B 37/00* | (2006.01) |
| *A63B 43/00* | (2006.01) |
| *A63B 45/00* | (2006.01) |
| *A63B 69/36* | (2006.01) |
| *A63B 47/00* | (2006.01) |
| *B29C 35/02* | (2006.01) |

(Continued)

(52) U.S. Cl.
CPC ......... *A63B 37/0003* (2013.01); *A63B 37/0074* (2013.01); *A63B 43/00* (2013.01); *A63B 43/008* (2013.01); *A63B 45/00* (2013.01); *A63B 47/00* (2013.01); *A63B 69/3655* (2013.01); *A63B 69/3688* (2013.01); *B29C 35/02* (2013.01); *B29C 35/0266* (2013.01); *B29C 35/0805* (2013.01); *B29C 35/16* (2013.01); *B29C 71/04* (2013.01); *A63B 37/0051* (2013.01); *A63B 37/0075* (2013.01); *A63B 37/0076* (2013.01); *A63B 47/005* (2013.01); *A63B 2225/60* (2013.01); *B29C 2035/0855* (2013.01); *B29C 2035/165* (2013.01); *B29C 2035/1616* (2013.01); *B29C 2035/1625* (2013.01); *B29C 2071/025* (2013.01); *Y10T 29/53* (2015.01)

(58) Field of Classification Search
USPC .................................. 473/351–378
See application file for complete search history.

(56) References Cited

U.S. PATENT DOCUMENTS

| 3,989,568 A | 11/1976 | Isaac |
| 5,413,332 A | 5/1995 | Montgomery |

(Continued)

FOREIGN PATENT DOCUMENTS

| EP | 2353665 A1 | 8/2011 |
| JP | 02-140179 A | 5/1990 |

(Continued)

OTHER PUBLICATIONS

Notification of International Preliminary Report on Patentablility of the International Preliminary Examining Authority in connection with International Patent Application No. PCT/US2012/70931 mailed on Dec. 30, 2013; 15 pages.

(Continued)

*Primary Examiner* — Alvin Hunter
(74) *Attorney, Agent, or Firm* — Honigman Miller Schwartz & Cohn LLP

(57) ABSTRACT

A method and system for making a golf ball core is disclosed. The method may generally include forming a golf ball core out of a raw core material. The golf ball core may be rapidly heated to begin curing (or vulcanizing) from the outermost surface toward the center of the golf ball core. Before curing the entire golf ball core, the golf ball core may be quenched to stop the curing process. As a result, the golf ball core may include an outer cured zone and an inner uncured zone. In this state, the golf ball core may be incorporated into a finished golf ball to be sold to consumers. Following a set of instructions provided with the golf ball, the consumer may heat the golf ball to customize the properties of the golf ball core, and, thus, the characteristics of the golf ball.

3 Claims, 7 Drawing Sheets

(51) Int. Cl.
*B29C 35/08* (2006.01)
*B29C 35/16* (2006.01)
*B29C 71/04* (2006.01)
*B29C 71/02* (2006.01)

(56) References Cited

U.S. PATENT DOCUMENTS

| | | | |
|---|---|---|---|
| 5,542,677 | A | 8/1996 | Sullivan et al. |
| 5,795,247 | A | 8/1998 | Yokota et al. |
| 5,810,677 | A | 9/1998 | Maruko et al. |
| 5,857,925 | A | 1/1999 | Sullivan et al. |
| 5,891,973 | A | 4/1999 | Sullivan et al. |
| 6,018,003 | A | 1/2000 | Sullivan et al. |
| 6,093,357 | A * | 7/2000 | Bissonette et al. ............ 264/248 |
| 6,130,411 | A | 10/2000 | Rockenfeller et al. |
| 6,174,388 | B1 | 1/2001 | Sikka et al. |
| 6,180,040 | B1 * | 1/2001 | Ladd et al. .................... 264/248 |
| 6,180,722 | B1 | 1/2001 | Dalton et al. |
| 6,207,095 | B1 | 3/2001 | Gosetti |
| 6,407,147 | B1 | 6/2002 | Kennedy, III et al. |
| 6,541,574 | B1 * | 4/2003 | Takemura et al. ......... 525/332.7 |
| 6,773,364 | B2 * | 8/2004 | Sullivan et al. ............... 473/370 |
| 6,855,070 | B2 | 2/2005 | Hogge et al. |
| 6,936,205 | B2 | 8/2005 | Cavallaro et al. |
| 6,939,497 | B2 * | 9/2005 | Scolamiero ................... 264/236 |
| 6,981,927 | B2 | 1/2006 | Aoyama |
| 7,048,651 | B2 | 5/2006 | Kennedy, III et al. |
| 7,148,266 | B2 | 12/2006 | Nesbitt et al. |
| 7,198,576 | B2 | 4/2007 | Sullivan et al. |
| 7,339,010 | B2 | 3/2008 | Kuntimaddi et al. |
| 7,377,863 | B2 | 5/2008 | Sullivan et al. |
| 7,427,243 | B2 | 9/2008 | Sullivan |
| 7,819,761 | B2 | 10/2010 | Kim et al. |
| 7,897,694 | B2 * | 3/2011 | Rajagopalan et al. ...... 525/328.9 |
| 8,012,392 | B2 * | 9/2011 | Scolamiero et al. .......... 264/236 |
| 8,235,880 | B2 | 8/2012 | Guier |
| 8,602,914 | B2 * | 12/2013 | Tutmark ...................... 473/351 |
| 2003/0052438 | A1 * | 3/2003 | Brum et al. ................... 264/236 |
| 2003/0209840 | A1 | 11/2003 | Hogge et al. |
| 2004/0238388 | A1 | 12/2004 | Snell |
| 2006/0148590 | A1 | 7/2006 | Sullivan et al. |
| 2007/0227943 | A1 | 10/2007 | Foushee |
| 2008/0081710 | A1 | 4/2008 | Chen et al. |
| 2008/0273911 | A1 | 11/2008 | Gueret |
| 2010/0056299 | A1 | 3/2010 | Egashira et al. |
| 2011/0009215 | A1 | 1/2011 | Ichikawa et al. |
| 2011/0053707 | A1 | 3/2011 | Ishii et al. |
| 2011/0064883 | A1 | 3/2011 | Goodwin |
| 2011/0095012 | A1 | 4/2011 | Cheng |
| 2011/0177890 | A1 | 7/2011 | Tutmark |
| 2012/0077621 | A1 | 3/2012 | Ishii et al. |
| 2012/0214615 | A1 | 8/2012 | Ishii et al. |
| 2013/0165259 | A1 | 6/2013 | Kennedy, III |
| 2013/0172121 | A1 | 7/2013 | Bender |
| 2013/0241111 | A1 | 9/2013 | Bender et al. |
| 2013/0256321 | A1 | 10/2013 | Bender |
| 2014/0066541 | A1 | 3/2014 | Tutmark |

FOREIGN PATENT DOCUMENTS

| | | |
|---|---|---|
| JP | 2001287472 A | 10/2001 |
| JP | 2011-189123 A | 9/2011 |
| JP | 2011189123 A | 9/2011 |
| WO | 2008042416 A1 | 4/2008 |
| WO | WO2008042416 A1 | 4/2008 |

OTHER PUBLICATIONS

PCT International Search Report and Written Opion Application No. PCT/US2012/070931, dated Mar. 31, 2013.
PCT International Search Report and Written Opinion Application No. PCT/US2012/070515, dated Apr. 29, 2013.
Utility U.S. Appl. No. 13/436,070 entitled "Method of Making a Golf Ball Core," filed Dec. 30, 2011.
Utility U.S. Appl. No. 13/779,515 entitled "Golf Ball Core and Method of Making a Golf Ball Core," filed Feb. 2, 2013.
Office Action in Utility U.S. Appl. No. 13/436,070, mailed on Dec. 28, 2012.
International Search Report and the Written Opinion of the International Searching Authority in connection with International Patent Application No. PCT/US2012/070931 mailed May 31, 2013; 13 pages.

* cited by examiner

| HEATING PROCESS | COOLING PROCESS | SPIN | PLAY CHARACTERISTICS ACHIEVED |
|---|---|---|---|
| MICROWAVE ON HIGH POWER FOR 1 MINUTE | COOL AT ROOM TEMPERATURE FOR 30 MINUTES | MEDIUM | LONGER DISTANCE |
| MICROWAVE ON HIGH POWER FOR 2 MINUTES | ICE BATH FOR 1 TO 5 MINUTES | HIGHER | MORE CONTROL |
| MICROWAVE ON HIGH POWER FOR 2 MINUTES | COOL AT ROOM TEMPERATURE FOR 30 MINUTES | HIGHEST | MOST CONTROL |

METHOD OF MAKING A GOLF BALL CORE

BACKGROUND

The present disclosure relates generally to a method of customizing the play characteristics of a golf ball.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, or a difference in the hardness may affect the rate of backspin. With regard to hardness in particular, a golfer may choose to use a golf ball having a cover layer and/or a core that is harder or softer. A harder golf ball will generally achieve greater distances but less spin, and so will be better for drives but more difficult to control on shorter shots. On the other hand, a softer golf ball will generally experience more spin and therefore be easier to control, but will lack distance.

Amateur golfers generally prefer to minimize the costs of purchasing new golf balls. However, a golfer may be required to purchase several sets of golf balls in order to achieve different play characteristics. For example, a golfer may purchase and use a set of hard golf balls for use specifically on longer courses, when the improved distance achieved by hard golf balls will be advantageous. In addition, a golfer may purchase and use a set of soft golf balls for use on shorter courses, or for use under conditions requiring increased control such as cold or wet weather. The need to purchase, store and carry several sets of golf balls in order to achieve a variety of play characteristics presents an inconvenience to the golfer, as well as increased costs.

Therefore, there is a need in the art for a system and method that addresses the shortcomings of the prior art discussed above.

SUMMARY

A method and system for making a golf ball core is disclosed. The method may generally include forming a golf ball core out of a raw core material. The golf ball core may be rapidly heated to begin curing (or vulcanizing) from the outermost surface toward the center of the golf ball core. Before curing the entire golf ball core, the golf ball core may be quenched to stop the curing process. As a result, the golf ball core may include an outer cured zone and an inner uncured zone. In this state, the golf ball core may be incorporated into a finished golf ball to be sold to consumers. Following a set of instructions provided with the golf ball, the consumer may heat the golf ball to customize the properties of the golf ball core, and, thus, the characteristics of the golf ball.

In one aspect, the disclosure provides a method of customizing a golf ball. The method may include heating a golf ball core to cure at least a portion of the golf ball core and rapidly cooling the golf ball core before the golf ball core finishes curing throughout the entire golf ball core such that a portion of the golf ball core is left uncured. The method may also include incorporating the golf ball core into a finished golf ball by applying at least one cover layer. The uncured portion of the golf ball core may remain uncured after the golf ball core is incorporated into the finished golf ball. The method may include heating the finished golf ball. The method may include cooling the finished golf ball. Rapidly cooling the finished golf ball may include quenching the finished golf ball in an ice bath, water bath, cryogenic fluids, dry ice/alcohol bath, or solid carbon dioxide/alcohol bath. Rapidly cooling the golf ball core may include quenching the golf ball core in an ice bath, water bath, liquid nitrogen, or carbon dioxide/alcohol bath. Heating the golf ball core to cure at least a portion of the golf ball core includes compression molding the golf ball core. Heating the finished golf ball may include heating the finished golf ball in a microwave. Heating the finished golf ball may include heating the finished golf ball in an oven. Heating the golf ball core to cure at least a portion of the golf ball core includes heating the golf ball core to a temperature ranging from about 350° F. to about 400° F.

In one aspect, the disclosure provides a method of customizing a golf ball. The method may include providing a golf ball to a consumer. The golf ball may include a cover layer surrounding a core having a cured zone and an uncured zone. The method may include indicating to the consumer to heat the golf ball to a preselected temperature, and then cool the golf ball so as to cause the golf ball to exhibit a desired play characteristic when hit with a golf club. Indicating to the consumer to heat the golf ball may include indicating to the consumer to microwave the golf ball at a preselected power for a preselected length of time. Indicating to the consumer to heat the golf ball may include indicating to the consumer to heat the golf ball in an oven preheated to a preselected temperature for a preselected length of time. Indicating to the consumer to cool the golf ball may include indicating to the consumer to cool the golf ball by quenching the golf ball in a bath of water. Indicating to the consumer to cool the golf ball may include indicating to the consumer to cool the golf ball by quenching the golf ball in a bath of ice and water. The cover layer may include a microwave transparent cover.

In one aspect, the disclosure provides a method of customizing a golf ball. The method may include forming a golf ball core by compression molding at least one slug of core material into a golf ball core. The core material may begin to cure during compression molding. The method may include quenching the golf ball core in a fluid to halt the curing of the core material. The method may include covering the golf ball core with a cover layer to form a finished golf ball. The method may include providing the finished golf ball to a consumer. The method may include indicating to a consumer to heat the finished golf ball to a preselected temperature to cause the finished golf ball to exhibit a desired play characteristic when hit with a golf club. The cover layer may include a microwave transparent cover. The method may include indicating to the consumer to cool the golf ball to cause the golf ball to exhibit a desired play characteristic when hit with a golf club. Compression molding at least one slug of core material may include heating a mold to 400° F.

In one aspect, the disclosure provides a kit of parts. The kit may include at least one golf ball including a cover layer surrounding a core having a cured zone and an uncured zone. The kit may include a set of instructions indicating to a consumer to heat the golf ball to a preselected temperature, and then cool the golf ball so as to cause the golf ball to exhibit a desired play characteristic when hit with a golf club. The kit of parts may include a stand for holding the golf ball. The uncured zone may include an inner core zone and the cured zone includes an outer core zone surrounding the inner core zone.

In one aspect, the disclosure provides a golf ball. The golf ball may have a core having a cured zone and an uncured zone. The golf ball may also have a cover layer surrounding the core. The cured zone may surround the uncured zone. Both the cured zone and the uncured zone may be made of a diene-containing composition.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the present disclosure provides methods for customizing a golf ball, in particular, customizing the hardness of a golf ball core, and associated kits that may be used to carry out the methods.

Figure 1:
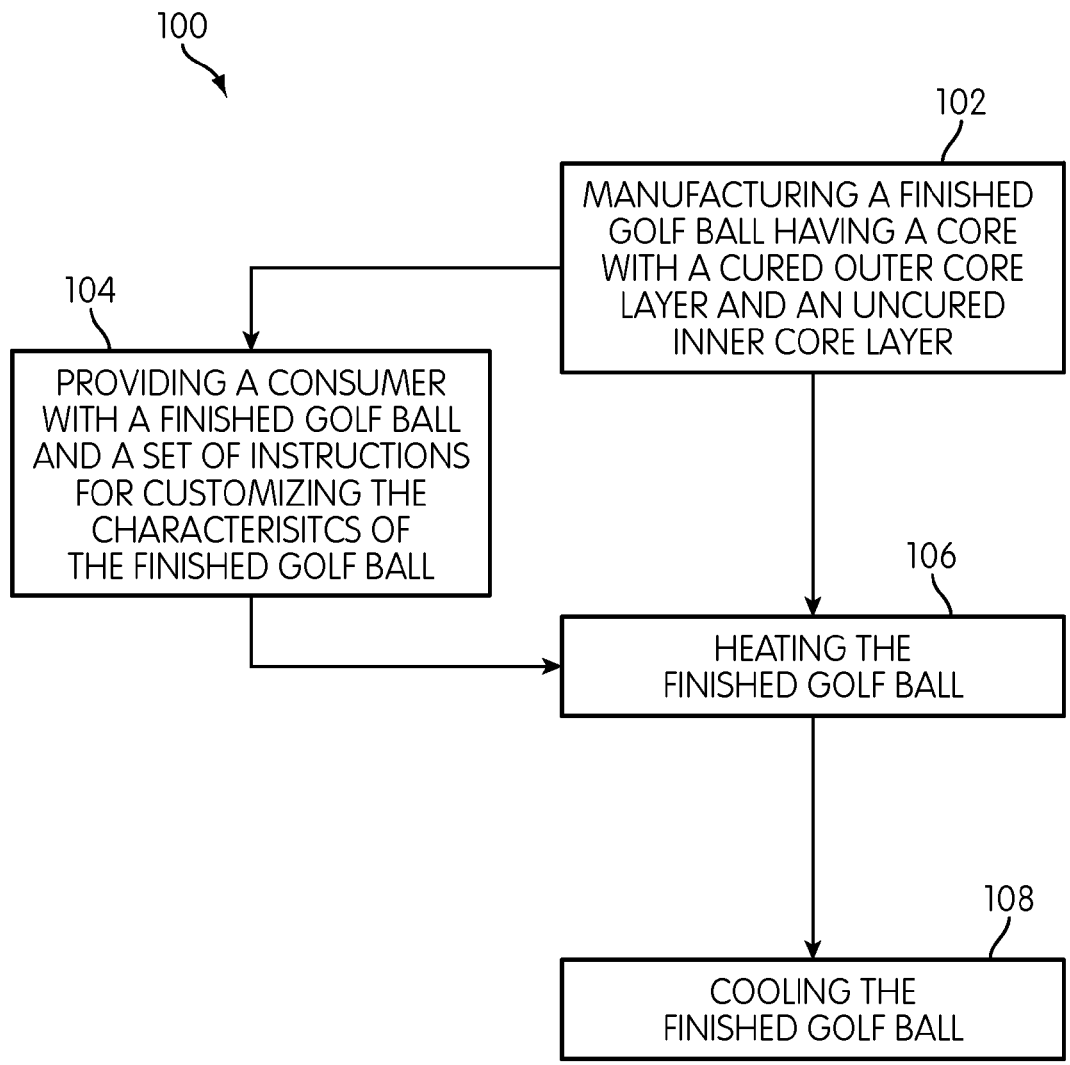
FIG. 1 is a flowchart showing a method according to an embodiment.
Figure 4:
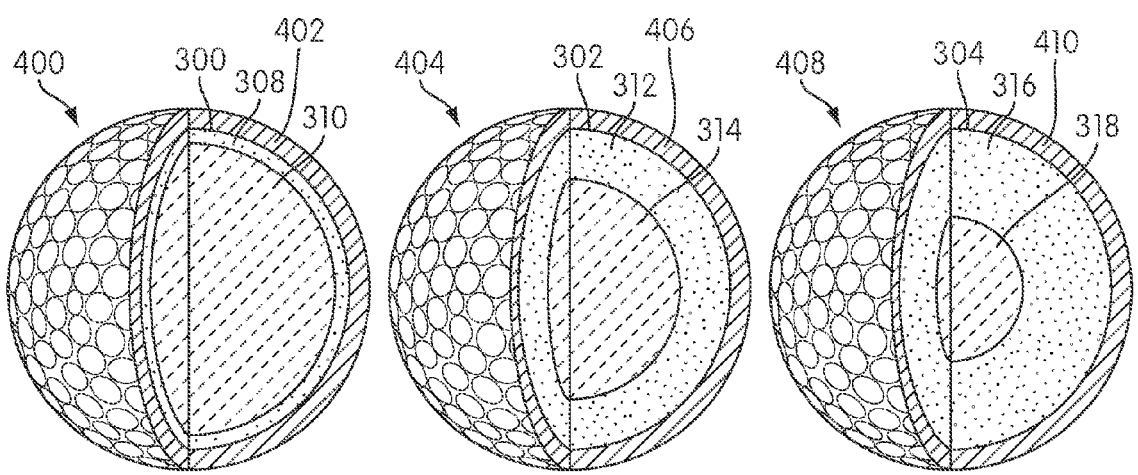
FIG. 4 is the three golf ball cores of FIG. 3 incorporated into finished golf balls.

FIG. 1 is a flowchart showing the overall process 200 by which a golf ball may be customized. Step 102 may include manufacturing a finished golf ball having a core with a cured outer core zone and an uncured inner core zone. A finished golf ball is a golf ball that includes all layers and components necessary for the golf ball to be used by a golfer in a game of golf. The finished golf ball may be a two-piece construct, having a core and a cover layer. The finished golf ball may include any number of layers, so long as the golf ball includes at least a two-piece core and at least one cover layer substantially disposed around the core. FIG. 4, described in more detail below, shows a finished golf ball 400 with a cured outer layer and an uncured inner layer. Finished golf ball 400 may include a golf ball core 300 with an outer core zone 308 and an inner core zone 310. Inner core zone 310 may be uncured and outer core zone 308 may be cured. Step 102 is described in more detail below with reference to FIG. 2.

The core material used to make the golf ball cores may include any suitable type of core material that may be cured (vulcanized). For example, in some embodiments, the golf ball cores may be formed primarily of rubber, such as a diene-containing composition, or metallocene catalyzed polyolefin. The type of core material used to make the golf ball cores may be selected based upon a variety of factors. For example, the golf ball core material may be selected based upon the desired coefficient of restitution.

Step 104 may include providing a consumer with a finished golf ball and a set of instructions for customizing the characteristics of the finished golf ball. In some embodiments, step 104 may be performed before step 106. In other embodiments, step 104 may be omitted and step 102 may be performed directly before step 106. Generally, step 106 and step 108 may be performed by a party other than the party responsible for manufacturing the golf ball. The golf ball may thereby undergo aftermarket customization. The customization may be performed by anyone post-manufacture, such as the end-user him or herself, or by (for example) a golf pro at a golf pro shop.

Step 106 may include heating the finished golf ball to a preselected temperature. The preselected temperature may be any temperature that delivers sufficient heat energy to cause crosslinking within the uncured inner core zone. The exact value of this temperature may depend on the type of material used in the golf ball core. The heating may cure the uncured inner core zone causing the inner core zone to increase in hardness. The desired hardness of the golf ball core may be selected by the end-user consumer golfer, or by another person such as a golf pro, so that the golf ball will achieve desired play characteristics. For example, if the golfer intends to play in colder weather, the golfer may select a lower hardness as the desired hardness. In some embodiments, the preselected temperature may be built into the steps of a heating process. In other words, instead of aiming to achieve a certain preselected temperature, an end-user consumer golfer may follow certain heating steps that may lead to a preselected temperature. For example, an end-user consumer golfer may microwave a finished golf ball on high power for 1 minute. While this process may raise the temperature of the finished golf ball to a preselected temperature, the end-user consumer golfer may not be aware of the preselected temperature. The specific microwaving process may achieve the preselected temperature. Thus, step 106 may include a process that heats the golf ball to a preselected temperature without a user knowing the preselected temperature.

Step 108 may include cooling the finished golf ball to halt the curing process. The golf ball may be cooled at a preselected rate that corresponds to the selected desired hardness. The preselected rate in may control the degree of crosslinking occurring in the inner core zone. The core material may have a low thermal conductivity causing the golf ball core to hold heat long enough to fully cure any uncured regions of the golf ball core. The faster the golf ball core is cooled, the sooner the crosslinking is halted. Thus, the rate at which the cured core zone cools may control the degree of crosslinking.

Figure 2:
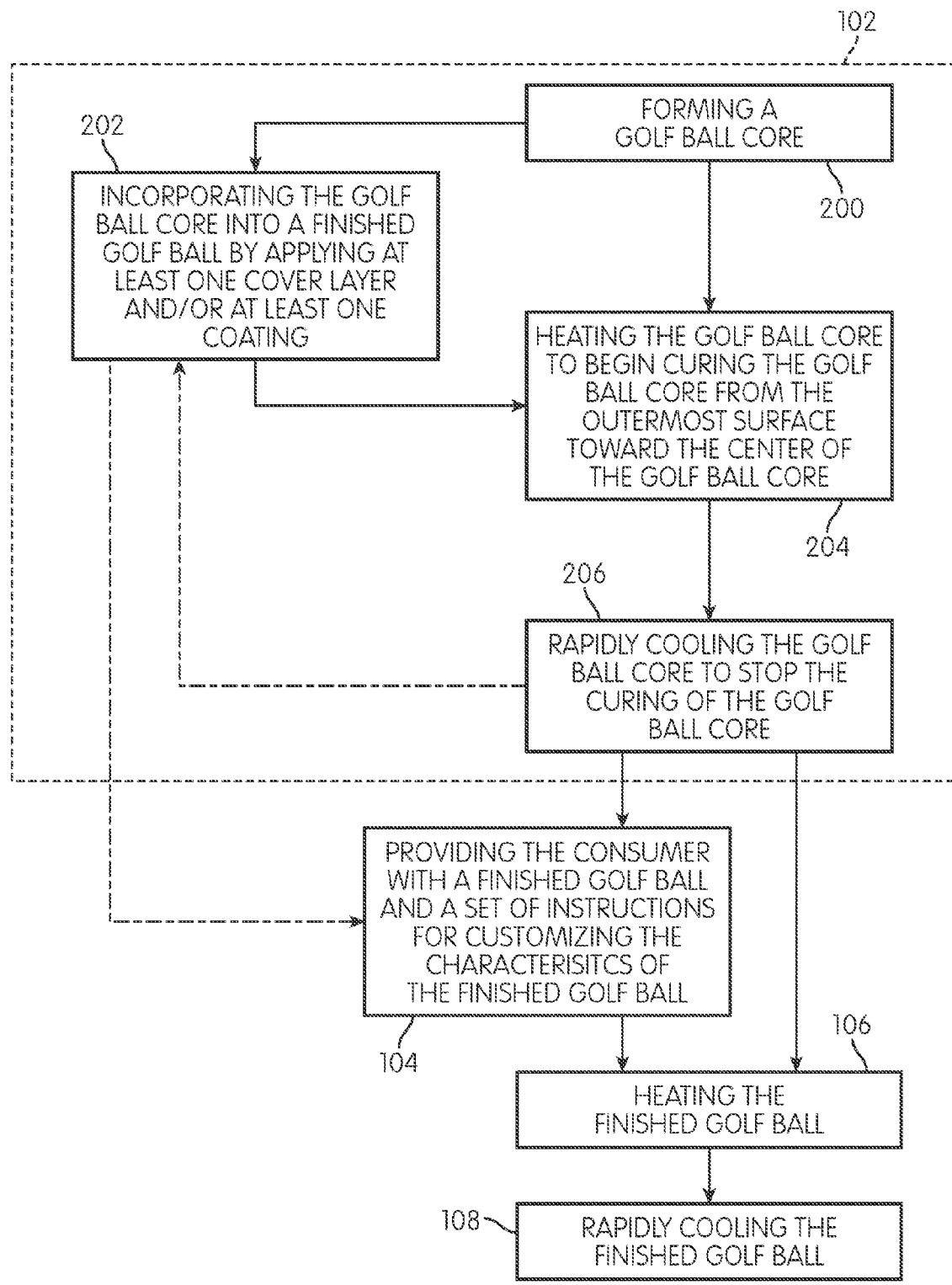
FIG. 2 is a flowchart showing details of the method of FIG. 1.

FIG. 2 is a flowchart showing step 102 in greater detail. Step 200 may include forming a golf ball core. Step 200 may be performed by any known method. For example, in some embodiments, the golf ball core may be molded. The method of forming the golf ball core may be selected based on a variety of factors. For example, the method may be selected based on the type of core material used to make the golf ball core and/or the desired size of the golf ball core.

Step 204 may include heating the golf ball core to begin curing the golf ball core from the outermost surface toward the center of the golf ball core. In some embodiments, step 200 may be performed together with step 204 simultaneously. For example, in some embodiments, step 200 may include compression molding a golf ball core. Compression molding involves using a mold to heat and press at least one slug of unmolded core material into a golf ball core. The heat applied during compression molding may cause the golf ball core to begin to cure from the outermost surface toward the center of the golf ball core. In some embodiments, the golf ball core may be compression molded at a temperature ranging from 350° F. to 450° F. For example, the golf ball core may be compression molded at a temperature of 400° F. In some embodiments, the compression molding may last for one to four minutes. The temperature and duration of the compression molding process may be selected based upon, for example, the desired thickness of the cured portion of the golf ball core and/or the desired degree of crosslinking.

Step 202 may include incorporating the golf ball core into a finished golf ball by applying at least one cover layer and/or at least one coating. In step 202, the at least one cover layer may be applied to the golf ball core by any suitable method. For example, in some embodiments, the at least one golf ball cover layer may be applied to the golf ball core with adhesive and pressure. In some embodiments, as discussed below with respect to performing step 202 and step 204 simultaneously, the at least one golf ball cover layer may be applied to the golf ball core through compression molding. The method used to apply the at least one cover layer to the golf ball core may be selected based on a variety of factors. For example, the method used to apply the at least one cover layer to the golf ball core may be selected based on the type of cover material used and/or the type of method used to form dimples on the outside of the cover layer.

In step 202, the coating may be optionally applied to the golf ball core by any suitable method. For example, in some embodiments, the coating may be applied to the at least one cover layer by spraying. The method used to apply the coating to the at least one cover layer may be selected based on a variety of factors. For example, the method used to apply the coating to the at least one cover layer may be selected based on the type of coating material used and/or the type of cover material used.

In some embodiments, step 202 may be performed before step 204. In other embodiments, step 200 may be performed directly before step 204 is performed. In such embodiments, step 202 may be performed after step 204 and step 206. In some embodiments, step 202 and step 204 may be performed together simultaneously, as discussed in greater detail below.

When step 204 is performed after step 202, the entire finished golf ball may be heated during step 204. Thus, heating the golf ball core may entail heating the entire finished golf ball. When step 204 is performed after either step 200 or step 202, the golf ball core may be heated by any suitable method. For example, in some embodiments, heating the golf ball core may be performed by placing the golf ball core in an oven. In some embodiments, heating the golf ball core may be performed by placing the golf ball core in a heated liquid, such as oil. The temperature of the oven or the heated liquid may be hot enough to induce crosslinking in the golf ball core.

The temperature the golf ball core is heated to during step 204 may be high enough to induce crosslinking in the golf ball core. The temperature the golf ball core is heated to during step 204 may be selected based upon the desired hardness of the golf ball core and/or other factors. The method used to heat the golf ball core may be selected based on a variety of factors. For example, in some embodiments, the method used to heat the golf ball core may be selected based on whether or not the golf ball core is heated before, during or after the golf ball core has been incorporated into a finished golf. In some embodiments, the method used to heat the golf ball core may be selected based on equipment available to the person heating the golf ball core.

As stated above, some embodiments may include performing step 202 and step 204 simultaneously. For example, applying at least one cover layer to the golf ball core may be carried out through compression molding. Compression molding involves using a mold to heat and press the cover layer onto the golf ball core. While heating the cover layer to the golf ball core, the golf ball core may absorb the heat applied to the cover layer. As a result, the golf ball core may begin to cure from the outermost surface toward the center of the golf ball core.

Step 206 may include rapidly cooling the golf ball core to stop the curing of the golf ball core. When step 206 is performed after step 202 has already been performed, the entire finished golf ball may be rapidly cooled to cool the golf ball core. Step 206 may include any suitable cooling method. For example, in some embodiments, step 206 may include quenching the golf ball core in a bath of ice and water, a water bath, a cryogenic fluid bath (e.g., liquid nitrogen), dry ice/alcohol bath, or solid carbon dioxide/alcohol bath. In some embodiments, the same fluids may be poured over the finished golf ball. The method of cooling the golf ball core may be selected based on a variety of factors. For example, the method of cooling the golf ball core may be selected based on the desired thickness of the cured portion of the golf ball core and/or the desired degree of crosslinking.

Figure 3:
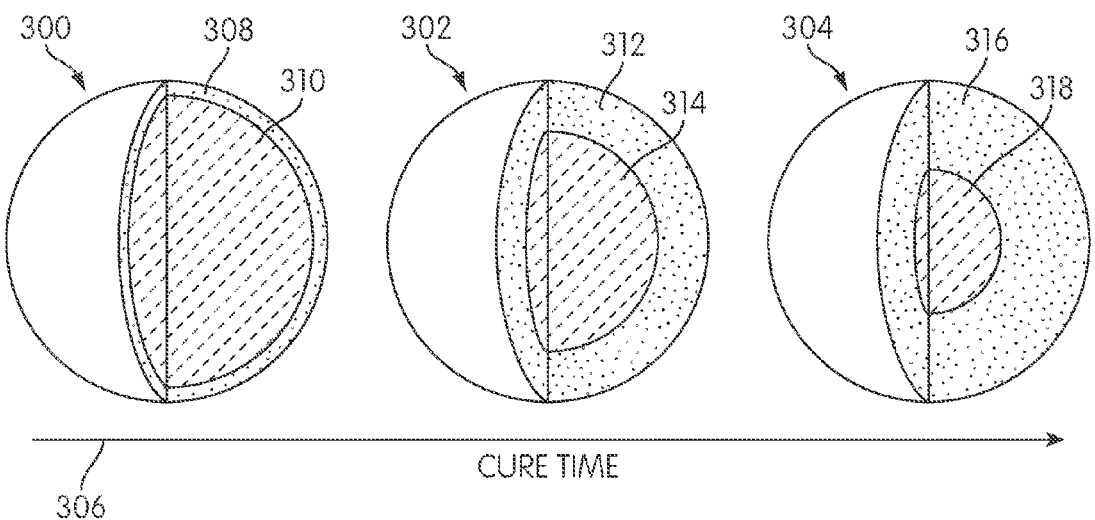
FIG. 3 shows three golf ball cores cured outer layers that vary in thickness as a function of cure time.

By rapidly cooling the golf ball core, the interior of the golf ball core may be prevented from heating up enough to initiate a crosslinking reaction. As a result, the inner core zone may be left uncured. FIGS. 3 and 4 illustrate how heating the golf ball core and rapidly cooling a golf ball core partway through a curing process may produce a golf ball core having multiple distinct regions. FIG. 3 shows the golf ball cores without cover layers and FIG. 4 shows finished golf balls with cover layers. Golf ball 400 may include a golf ball core 300 and a cover layer 402. Golf ball core 300 may include an outer core zone 308 and an inner core zone 310. Golf ball 404 may include a golf ball core 302 and a cover layer 406. Golf ball core 302 may include an outer core zone 312 and an inner core zone 314. Golf ball 408 may include a golf ball core 304 and a cover layer 410. Golf ball core 304 may include an outer core zone 316 and an inner core zone 318. The outer core zone of each golf ball core may make up a cured region of the core. The inner core zone of each golf ball core may make up an uncured region of the core.

While the golf ball cores in the embodiment in FIGS. 3 and 4 are shown with two distinct regions, the golf ball cores may include more than two distinct regions. The number of distinct regions may be selected based on a variety of factors. For example, the number of distinct regions may be selected based on the desired coefficient of restitution.

As indicated by the cure time line 306 in FIG. 3, the cured region of the golf ball core may increase as the golf ball core is exposed to heat. For example, golf ball core 302 may be exposed to heat longer than golf ball core 302. Thus, outer core zone 312 may be thicker than outer cure layer 308. Similarly, golf ball core 302 may be exposed to heat longer than golf ball core 302. As a result, outer core zone 316 may be thicker than outer core zone 312.

Figure 5:
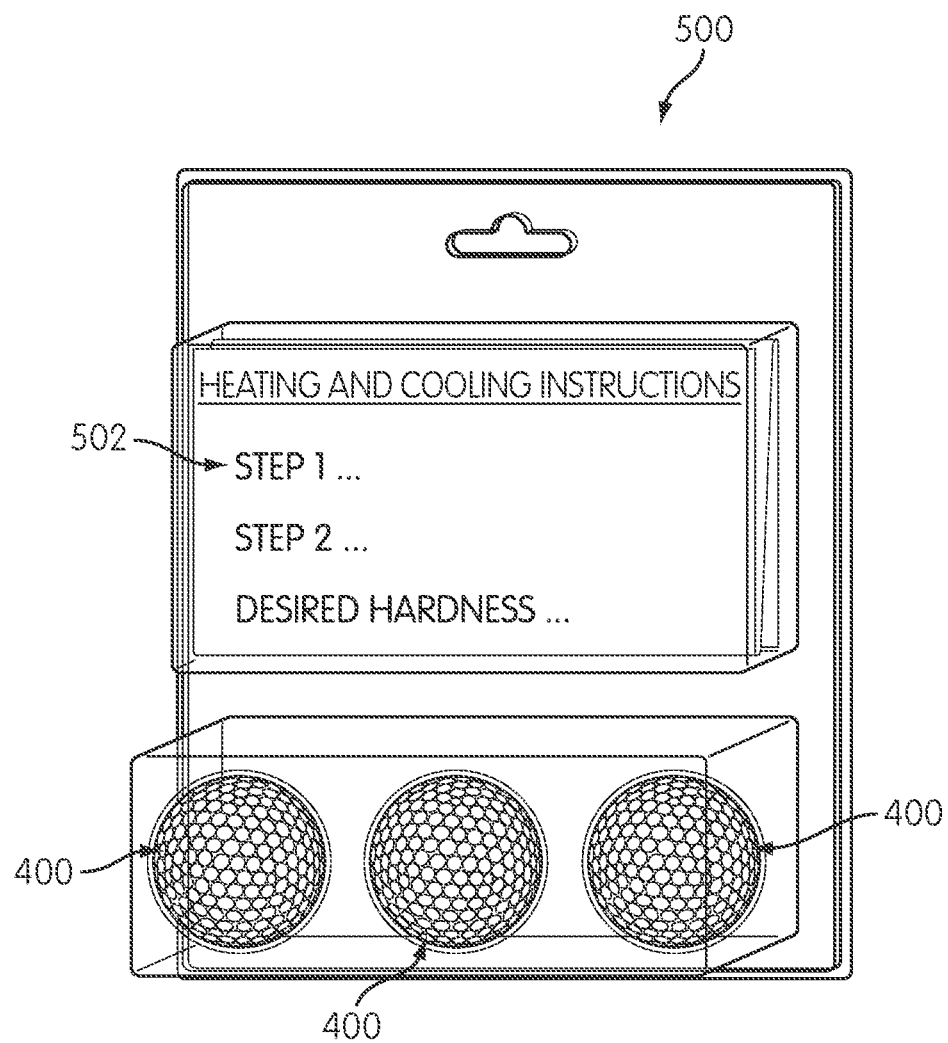
FIG. 5 is a kit that can be used to carry out the disclosed method.
Figures 8, 9:
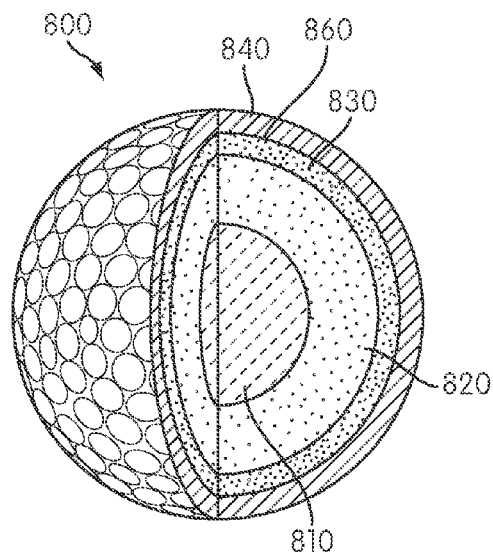
FIG. 8 discloses a finished golf ball having a core including three distinct regions.
FIG. 9 shows a chart that may be included in the kit of FIG. 5.

FIG. 5 shows an example of a kit 500 that may be used to carry out the method of the disclosure. Kit 500 may include at least one golf ball 400, discussed above, and a set of instructions 502 for customizing the characteristics of the golf ball. In some embodiments, instructions 502 may include a graphical representation indicating to the end-user consumer to heat the golf ball to a preselected temperature, and then cool the golf ball at a preselected rate so as to cause the golf ball to exhibit a desired play characteristic. In some embodiments, instructions 502 may include a chart displaying which methods produce certain play characteristics. For example, FIG. 9 shows a chart 900 displaying methods of performing step 106 and step 108 to achieve longer distance, more control, or most control. These heating processes and cooling processes are exemplary. In some embodiments, the heating process may include other types of heating, such as heating in an oven or a hot liquid bath. In some embodiments, the heating process may include heating the golf ball at a certain temperature. For example, in some embodiments, the golf ball may be heated in an oven preheated to 400° F. In some embodiments, the heating process may include heating the golf ball for other lengths of time. For example, the golf ball may be heating in an oven for 20 minutes.

In some embodiments, chart 900 may include other types of cooling processes, such as cooling in a refrigerator, freezer, and/or a water bath. Similar to the heating processes, the cooling processes may include different times or temperatures. For example, a water bath may be cooled to a preselected temperature before the golf ball is quenched in the water bath.

The play characteristics listed in chart 900 are exemplary. In some embodiments, other play characteristics and/or ball characteristics may be listed in chart 900 instead of or in addition to the play characteristics shown in FIG. 9. For example, chart 900 may list ball hardness and/or ball feel.

In some embodiments, a kit may include an additive that aids in the heating and/or cooling steps. The additive may be any substance that can be added to a heat exchange medium (such as warm or cold water) or to the golf ball itself, in order to improve an aspect of the heating or cooling step. The additive may be (for example) a water softener to remove salts from water that would otherwise negatively affect the golf ball by forming deposits thereon. The additive may also be, for example, an external microwave absorbing additive that is placed on the outside of the golf ball cover layer in order to aid in the absorption of microwaves when step 106 includes using a microwave. More generally, the additive may be (for example) a purified high specific heat liquid, such that a consumer may heat or cool the golf ball using the purified high specific heat liquid instead of water.

In some embodiments, a kit used to carry out the method of the disclosure may include a heater. For example, the kit may include the handheld clamp fully described in U.S. Patent Publication Number 2011/0095012, entitled Device for Heating a Golf Ball, and filed on Oct. 23, 2009, the disclosure of which is hereby incorporated in its entirety, and fully described in U.S. Patent Publication Number 2011/0177890, entitled Methods and Systems for Customizing a Golf Ball, and filed on Jan. 20, 2010, the disclosure of which is hereby incorporated in its entirety.

Accordingly, the present method and systems of kits allows aftermarket customization of a golf ball. An end-user, or other person, may perform the method on a golf ball so as to achieve a desired play characteristic, and thereby avoid the need to purchase multiple sets of golf balls having different inherent immutable play characteristics. From the perspective of a manufacturer, the method of providing a golf ball and indicating to the user allows the manufacturer to provide a superior system for customizing golf balls to their customers.

Figure 6:
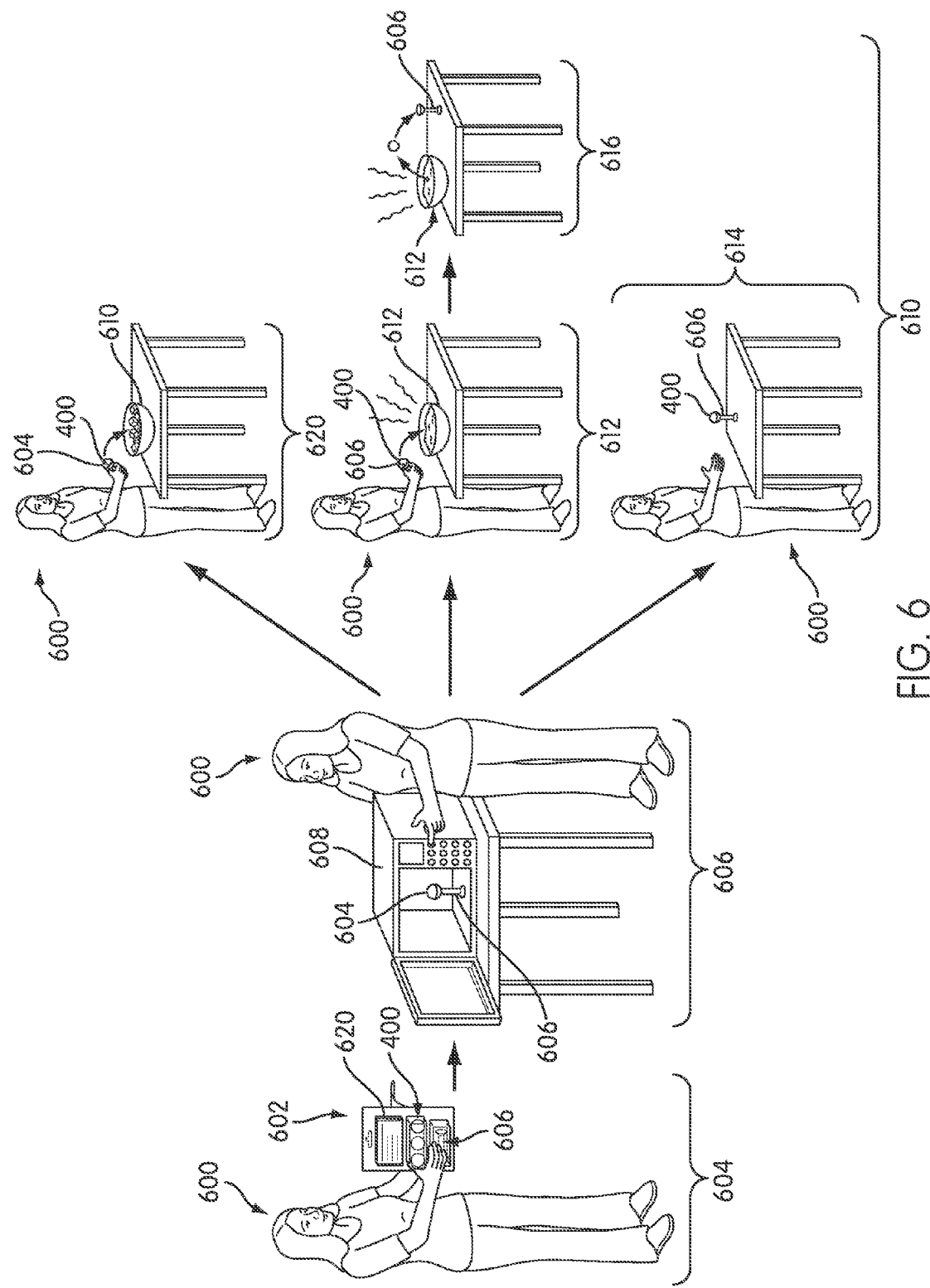
FIG. 6 shows an end-user consumer performing the disclosed method according to multiple embodiments.

FIG. 6 shows an end-user performing an embodiment of the method shown in FIGS. 1 and 2. Specifically, the end user 600 may receive a kit 602 in step 604. Kit 602 may include at least one golf ball 400, discussed above, a set of instructions 620, and a stand 606 for holding golf ball 400. Instructions 620 may include the chart shown in FIG. 9. End-user 600 may consult instructions 620 when customizing the golf ball.

Next, in step 606, end-user 600 may heat golf ball 400 to a preselected temperature using a microwave 608 by placing golf ball 400 on stand 606 inside microwave 608. The end-user may choose a desired hardness and/or play characteristics and select the heating power and heating time. For example, in some embodiments, the end-user may choose from low, medium, and high microwave power settings. The end-user may also choose from among the following heating times: one minute, two minutes, three minutes, and four minutes. For example, an end-user may prefer a softer ball and may, therefore, choose to heat golf ball 400 for one minute on a medium power setting. In another example, the end-user may prefer a harder ball and may, therefore choose to heat golf ball 400 for three minutes on a high power setting.

In some embodiments, cover layer 402 of golf ball 400 may include a microwave transparent material. Generally, a microwave transparent material allows microwaves pass through the material. Using a microwave transparent material in cover layer 402 may ensure that the cover layer allows heat to pass through to the golf ball core.

After step 606, the end-user may choose a desired hardness and select one of three cooling paths in step 610. For example, if end user 600 desires a soft inner core zone, then the end-user may perform step 620 by quenching golf ball 400 in a cold water bath 610. In a particular embodiment, the cold water bath may have a temperature of between about 4° F. and about 13° F., and golf ball 400 may be quenched for a time period of from about one minute to about five minutes. However, a variety of alternative methods of quickly cooling the golf ball are within the scope of step 620, as are known in the art of heat exchangers. For example, step 620 may include quenching the golf ball core in an ice bath, liquid nitrogen, or carbon dioxide/alcohol bath. In some embodiments, step 620 may include pouring fluids over the finished golf ball.

Alternatively, if end-user 600 desires a harder inner core zone on golf ball 400, in some embodiments, end-user 600 may perform steps 612 and 616 or step 614. In step 612, end-user 600 may cool golf ball 400 in a warm water bath 612. The warm water bath 612 may have a temperature of between about 40° F. and about 70° F. Golf ball 400 may be placed in warm water bath 612 for a time period of from about one minute to about ten minutes. Subsequently, after step 612, golf ball 400 may be removed from warm water bath 612 and placed on stand 606 to air cool to room temperature.

Thirdly, golf ball 400 may be allowed to slowly air cool, without an intermediate cooling step, as in step 614.

Generally, FIG. 6 shows an embodiment of how an end-user may perform the step 106 and step 108 using readily available household equipment. However, each of steps 606, 620, 612 and 616, and 614 are intended to broadly encompass any heat exchange process that heats or cools the golf ball at the indicated rate so as to achieve the desired hardness. For example, the heating process may use a conventional oven, a hot liquid bath, or a hot air source. The use of readily available household equipment makes the process easy for an end-user consumer to perform. However, larger scale heat exchange systems may be used in other embodiments, such as when the method is performed in a golf pro-shop.

Figure 7:
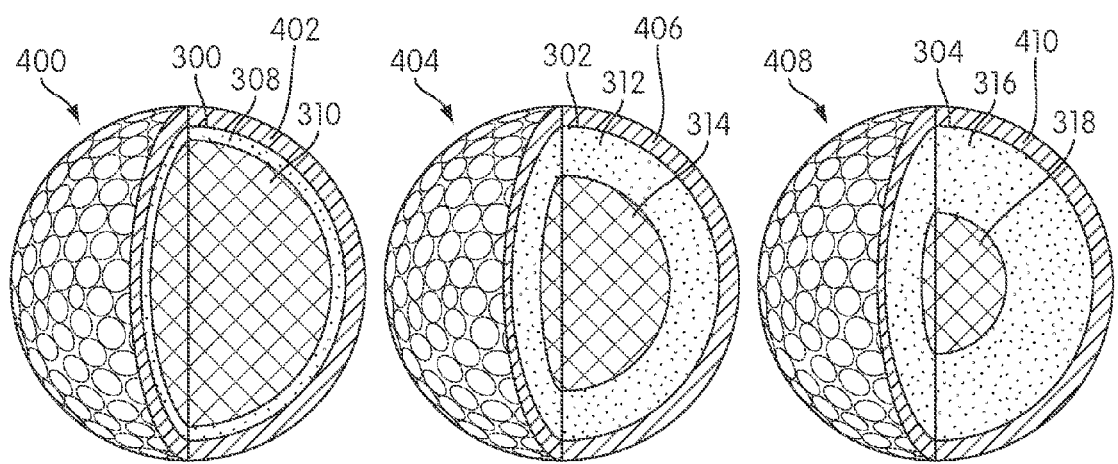
FIG. 7 shows the three finished golf balls of FIG. 4 after undergoing a heating and cooling process.

FIG. 7 illustrates golf ball 402, golf ball 404, and golf ball 408 after step 106 and step 108. Inner core 310, inner core 314, and inner core 318 may be cured after step 106 and step 108. FIG. 8 illustrates an embodiment in which a golf ball 800 has a cover layer 840 and a core 860 including three distinct areas. An outer core zone 830 may be developed during a first curing process. For example, step 204 and step 206 may be performed to develop outer core zone 830. A middle core zone 820 may be developed during a second curing process.

For example, step 106 and step 108 may be performed to develop middle core zone 820. And an inner core zone 810 may be developed during a third curing process. For example, step 106 and step 108 may be repeated to develop middle core zone 820.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making a golf ball that can be customized for a desired play characteristic, comprising
heating a curable rubber golf ball core to partially cure at least a portion of the golf ball core;
rapidly cooling the golf ball core before the golf ball core finishes curing, wherein a portion of the golf ball core is left uncured, and wherein rapidly cooling the golf ball core includes quenching the golf ball core in an ice bath, water bath, cryogenic fluid, or dry ice/alcohol bath; and
incorporating the golf ball core into a finished golf ball by applying at least one cover layer, wherein the uncured portion of the golf ball core remains uncured after the golf ball core is incorporated into the finished golf ball; and determining a time and temperature of further curing the golf ball core to provide the desired play characteristic.

2. The method according to claim 1, wherein heating the golf ball core to cure at least a portion of the golf ball core includes compression molding the golf ball core.

3. The method according to claim 1, wherein heating the golf ball core to cure at least a portion of the golf ball core includes heating the golf ball core to a temperature ranging from about 350° F. to about 400° F.

* * * * *